United States Patent
Nozaki et al.

(10) Patent No.: US 9,706,468 B2
(45) Date of Patent: Jul. 11, 2017

(54) WIRELESS COMMUNICATION NODE HAVING NEIGHBOR NODE INFORMATION REGISTERED

(71) Applicant: Oki Electric Industry Co., Ltd., Tokyo (JP)

(72) Inventors: Masanori Nozaki, Tokyo (JP);
Yoshihisa Nakano, Tokyo (JP);
Takahiko Hashizume, Gunma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 280 days.

(21) Appl. No.: 14/317,427

(22) Filed: Jun. 27, 2014

(65) Prior Publication Data
US 2015/0085830 A1   Mar. 26, 2015

(30) Foreign Application Priority Data
Sep. 24, 2013  (JP) .................................. 2013-197271

(51) Int. Cl.
| | | |
|---|---|---|
| *H04L 12/733* | (2013.01) | |
| *H04W 40/02* | (2009.01) | |
| *H04W 40/00* | (2009.01) | |

(52) U.S. Cl.
CPC .................................. *H04W 40/00* (2013.01)

(58) Field of Classification Search
CPC .... H04L 12/44; H04W 72/1231; H04W 84/18
See application file for complete search history.

(56) References Cited

U.S. PATENT DOCUMENTS

| 2011/0019582 A1* | 1/2011 | Okmyanskiy | ....... H04L 41/0893 370/254 |
| 2012/0108286 A1* | 5/2012 | Nishimura | .......... H04W 52/228 455/522 |

(Continued)

FOREIGN PATENT DOCUMENTS

| JP | 2003-030772 A | 1/2003 |
| JP | 2006-339762 A | 12/2006 |

(Continued)

OTHER PUBLICATIONS

R. Kelsey, "Mesh Link Establishment", Jun. 2012, pp. 1-23.*

(Continued)

*Primary Examiner* — Scott M Sciacca
(74) *Attorney, Agent, or Firm* — Rabin & Berdo, P.C.

(57) ABSTRACT

A wireless communication node on the multi-hop wireless network has a control message exchanger for exchanging control messages with peripheral nodes to determine neighbor nodes whose information should be registered in a neighbor node information storage; a timing adjuster for adjusting, depending on a connective state of the wireless communication node in the network, a timing at which a first control message is sent back in response to a second control message arriving from other wireless communication nodes; and a registered node determiner for primarily referencing the order of arrival of a first control message from the other wireless communication node to determining neighbor nodes whose information should be registered in the neighbor node information storage.

11 Claims, 10 Drawing Sheets

(56) References Cited

U.S. PATENT DOCUMENTS

| | | | | |
|---|---|---|---|---|
| 2013/0070648 A1* | 3/2013 | Kubo | ................ | H04W 72/1257 |
| | | | | 370/256 |
| 2013/0077505 A1* | 3/2013 | Choudhary | ........... | H04W 48/14 |
| | | | | 370/252 |
| 2013/0227290 A1* | 8/2013 | Yoneyama | .......... | H04L 63/0869 |
| | | | | 713/169 |
| 2013/0235745 A1* | 9/2013 | Zhang | ................... | H04W 72/08 |
| | | | | 370/252 |

FOREIGN PATENT DOCUMENTS

| | | |
|---|---|---|
| JP | 2007-199761 A | 8/2007 |
| JP | 2009-218811 A | 9/2009 |

OTHER PUBLICATIONS

Katsuhiro Okaniwa et al., "ZigBee IP Specifications in the 920 MHz band in Japan" OKI Technical Review No. 221, pp. 70-73, May 2013.

The Telecommunication Technology Committee, "Method B" of TTC standards "JJ-300, 10 Echonet Lite-directed Home Network Communication Interface", first ed., Feb. 2013.

\* cited by examiner

WIRELESS COMMUNICATION NODE HAVING NEIGHBOR NODE INFORMATION REGISTERED

BACKGROUND OF THE INVENTION

Field of the Invention

The present invention relates to a wireless communication node, and more particularly to a wireless communication node having neighbor node information registered in a neighbor node lookup table in order to perform communications with a neighbor node on a multi-hop wireless network.

Description of the Background Art

A multi-hop wireless network is constituted with a plurality of wireless communication nodes, each of which has a packet transfer function to transfer and receive packets to and from its adjacent wireless communication nodes to thereby allow packets to be transmitted even to nodes residing beyond the area covered by the radio waves emitted by that node. A representative example of such a multi-hop wireless network is ZigBee (trade name) IP (Internet Protocol) technology as described in, for example, "Method B" of TTC standards "JJ-300, 10 ECHONET Lite-directed Home Network Communication Interface", first ed., published on February 2013, and Katsuhiro Okaniwa, et al., "ZigBee IP Specifications in the 920 MHz band in Japan", OKI Technical Review, No. 221, pp. 70-73, May 2013. The ZigBee IP technology is standardized by the ZigBee Alliance and will simply be referred to as "ZIP". Note that the ZIP applied to the 920 MHz band is referred to as 920ZIP.

Reference will be made first to FIGS. 8A and 8B for understanding operations of routers, or wireless communication nodes, and a coordinator in ZIP taught by Katsuhiro Okaniwa, et al., for example. FIGS. 8A and 8B show a router ZR2 intended to join in a network, a router ZR1 located around the router ZR2 and a coordinator ZC having an authentication server function. The peripheral router ZR1 shown in the figures is a router to be listed in a neighbor node lookup table of the newly joining router ZR2 by a protocol described later, and be referred to as a neighbor node after listed.

At timing S1, the router ZR2, i.e. newly joining router, broadcasts a beacon request to peripheral nodes. When receiving the beacon request from the router ZR2, the peripheral router ZR1 sends a beacon as a reply to inform the presence of the peripheral router ZR1 itself to the router ZR2. At this time, the network ID (IDentification) in the ZIP is set forth in the beacon payload. That allows the newly joining router ZR2 to be aware which network it would participate in. If there are a plurality (n) of peripheral routers, the newly joining router ZR2 receives n beacons as reply.

Then, at timing S2, in order to start authentication by the participation of PANA (Protocol for carrying Authentication for Network Access) in the coordinator ZC, the newly joining router ZR2 sends PCI (PANA Client Initiation) to the peripheral router ZR1. Upon receiving the PCI from the peripheral router ZR1, the coordinator ZC performs authentication, and in turn sends authentication results including a network key to the newly joining router ZR2 via the peripheral node ZR1. The peripheral node ZR1 having received the PCI will operate as a PANA relay station for the newly joining router ZR2.

Then, at timing S3, when the participation authentication by using PANA has completed, the newly joining router ZR2 exchanges counter values with the peripheral router ZR1 in order to perform encrypted communications of MAC (Media Access Control) layer by means of the network key given at timing S2. For exchanging counter values, a Mesh Link Establishment (MLE) protocol is used which runs on the UDP (User Datagram Protocol) for transmitting and receiving node and link properties to and from nodes.

Then, at timing S4, in order that the newly joining router ZR2 determines its own IPv6 address, it sends and receives, to and from the peripheral router ZR1, a router request RS (Router Solicitation) requesting a prefix and a router reply RA (Router Advertisement) notifying a prefix, thereby getting the prefix of the IPv6 address from the peripheral router ZR1. The IPv6 address of the newly joining router ZR2 is generated from a short address (SA) of 16 bits, which is determined at random by that node itself. That may cause the same IPv6 address to be generated within the network. Thus, the newly joining router ZR2 sends out a Neighbor Solicitation (NS) to the peripheral router ZR1, which in turn produces a duplicate address request (DAR) to the coordinator ZC to allow the coordinator ZC to determine whether or not the same address has been used in the past. The coordinator ZC then sends a duplicate address confirmation (DAC) including the results of the determination to the peripheral node ZR1, from which a neighbor advertisement (NA) of the address confirmation is sent to the newly joining router ZR2. When receiving the neighbor advertisement, the newly joining router ZR2 recognizes whether or not the short address is duplicate. The address duplicate request (DAR) and address duplicate confirmation (DAC) are stipulated in the 6lowpan-nd, IPv6 over Low power Wireless Personal Area Networks-Neighbor Discovery.

At timing S5, the newly joining router ZR2 having its short address confirmed starts a search for a neighbor node and sends an MLE link request (MLR) by multicast addressing. When receiving this message, the neighbor node ZR1 sends back an MLE link accept and request (MLAR) if its own neighbor node lookup table includes an idle space for storage. Finally, the newly joining router ZR2 sends back an MLE link accept (MLA), thus completing the registration into the lookup table. Subsequently, the newly joining router ZR2 performs encrypted communications only with routers registered in the neighbor node lookup table.

Then, at timing S6, in order to build up a multi-hop route, the newly joining router ZR2 starts an operation of RPL (IPv6 Routing Protocol for Low-Power and Lossy Networks), i.e. a routing protocol of IPv6.

Specifically, in order to obtain peripheral route information, the newly joining router ZR2 multicasts a DODAG (Destination Oriented Directed Acyclic Graph) Information Solicitation (DIS) regarding a DODAG. When receiving a DODAG Information Solicitation, the neighbor node sends back a DODAG Information Object (DIO) to give RPL information such as identification information DODAG-ID on the tree topology and an RPL instance. The newly joining router ZR2 unicasts this information solicitation (DIS) to one of the neighbor nodes that is most suitable for a prioritized parent node, and obtains route information from an information object DIO sent in reply. Finally, the newly joining router ZR2 sends the parent information in the form of DAO (Destination Advertisement Object) messages to the coordinator ZC. In response, the coordinator ZC sends a receipt acknowledgment, DAO ACK. Thus, the coordinator ZC can know the parent-child relationships between the nodes, so that a downlink route can be established by source routing.

At timing S7, the quality of a link is measured. In the 920ZIP, as a metric for determining a route, the reciprocal of a packet receipt rate is used, for example. The packet receipt rate is measured between the neighbor nodes by periodic advertisement according to the mesh link establishment protocol MLE. MRHOF (The Minimum Rank with Hysteresis Objective Function) is also used for computing the value of a rank that is an index denoting the relative position with respect to the top node, or root node, of each node or router, the top node having the coordinator located. By hysteretic characteristics, contrivances are made to prevent the route from being changed too frequently if the packet receipt rate varies.

As described above, in the ZIP method of prior art, in order that a local node performs encrypted communications with neighbor nodes or routers, that node has to register a certain neighbor node in its lookup table. For that aim, at the above-stated timing S5 for searching for a neighbor router, UDP packets according to the mesh link establishment (MLE) protocol are exchanged with neighbor nodes to thereby formulate the neighbor node lookup table.

At this time, the newly joining node multicasts, or broadcasts, an MLE link request (MLR) to peripheral nodes as described above. However, if the neighbor nodes send back their replies at once, the packets would collide with each other so that the replies to the MLE link request (MLR) may not appropriately be received by the newly joining node. Therefore, when the neighbor nodes receive an MLE link request (MLR), they send back to the newly joining node an MLE link accept and request (MLAR) after a random period of time elapses since they have received the MLE link request (MLR), whereby a conflict of packets can be minimized. When receiving an MLE link accept and request (MLAR), the newly joining node then needs to send back an MLE link accept (MLA) to the any neighbor nodes. However, in the Mesh Link Establishment (MLE) protocol, it is not stipulated that the newly joining node should send back an MLE link accept (MLA) to which of its neighbor nodes.

Generally, it would be considered that the newly joining node should send back an MLE link accept and request (MLAR) on a first-in first-out basis in the order of receiving MLE link accept and requests (MLARs). However, as described above, the timing of sending back MLE link accept and requests (MLARs) involves random factors, see FIG. 3 described later, and hence the conventional wireless communication nodes do not assure that a suitable node for a neighbor node can necessarily be selected, which satisfies requirements such as a small rank value in reaching the coordinator and a large Received Signal Strength Intensity (RSSI).

Furthermore, in the conventional method for creating a neighbor node lookup table, if the maximum number of register nodes registerable in a neighbor node lookup table is set fewer than neighbor nodes, it is impossible to register all the neighbor nodes in the neighbor node lookup table. Therefore, even when the user intentionally installs a new relay node, the newly installed relay node may not always be registered in the neighbor node lookup table of the intended node.

Accordingly, there is a demand for wireless communication nodes capable of solving the foregoing problems with registration of neighbor nodes.

SUMMARY OF THE INVENTION

It is an object of the present invention to provide a wireless communication node which can register peripheral nodes suitable for neighbor nodes.

In accordance with the present invention, a wireless communication node on a multi-hop wireless network comprises a neighbor node information storage for storing information about a neighbor node; a control message exchanger for exchanging a control message with a peripheral node to determine a neighbor node whose information should be registered in the neighbor node information storage; a timing adjuster for referencing a connective state of the wireless communication node in the multi-hop wireless network to adjust timing at which a first control message is sent back in response to a second control message arriving from another wireless communication node; and a registered node determiner for primarily using the order of arrival of the first control message from the other wireless communication node to determine the neighbor node whose information should be registered in the neighbor node information storage.

In accordance with the present invention, it is possible to register suitable peripheral nodes in a newly joining node for its neighbor nodes.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Now, preferred embodiments of the present invention will be described in detail with reference to the accompanying drawings. In the figures, the components and elements are merely schematically depicted to the extent that the present invention can be sufficiently understood. Therefore, the present invention is not to be restrictively comprehended only by the illustrated embodiments.

Figure 1:
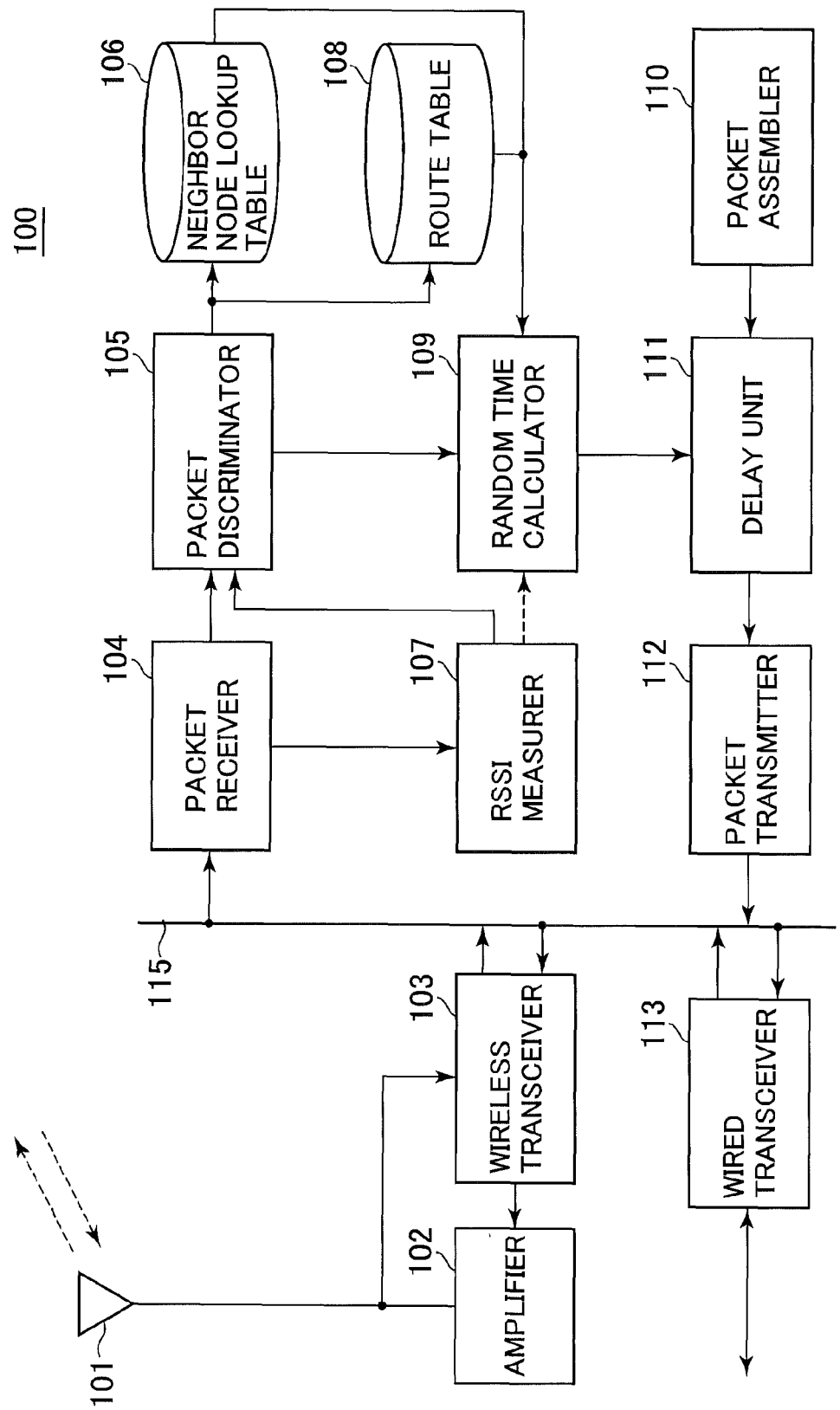
FIG. 1 is a schematic block diagram showing the configuration of a wireless communication node in accordance with an illustrative embodiment of the present invention.

FIG. 1 is a schematic block diagram showing the configuration of a wireless communication node in a multi-hop wireless network in accordance with a preferred embodiment of the present invention. The multi-hop wireless network according to the embodiment may not be limited to nor out of spec of ZIP (ZigBee IP) requirements. For example, the multi-hop wireless network according to the illustrative embodiment may include wireless communication nodes according to the illustrative embodiment and a top node, the wireless communication nodes and top node corresponding to routers and a coordinator, respectively, in ZIP.

As shown in FIG. 1, the wireless communication node 100 according to the illustrative embodiment includes an antenna 101, an amplifier 102, a wireless transceiver 103, a packet receiver 104, a packet discriminator 105, a neighbor node lookup table (LUT) 106, an RSSI measurer 107, a route table 108, a random time calculator 109, a packet assembler 110, a delay unit 111, a packet transmitter 112, and a wired transceiver 113, which are interconnected as depicted. The wireless communication node 100 may be implemented in hardware. Of course, some of the functions of the node 100 may be implemented in software by means of a processor system including a CPU (Central Processor Unit), a ROM (Read-Only Memory), a RAM (Random Access Memory) and the like. In this case, the wireless communication node 100 may have storage storing a wireless communication node program executed by the CPU for instructing a computer installed at the wireless communication node 100 to function as a neighbor node information table, a control message exchanger, a timing adjuster, a registered node determiner and so on. In either case, the configuration of the node 100 can be represented functionally by the functional blocks as shown in FIG. 1.

The antenna 101 is for use in both transmitting and receiving wireless or radio signals to and from peripheral nodes. In the embodiment, the antenna 101 is a transmitter and receiver antenna, but the wireless communication node 100 may be provided with a transmitter antenna and a receiver antenna which are separate from each other.

The amplifier 102 is adapted to enhance the intensity, or electric power, of radio waves to be transmitted conveying wireless signals. The upper limit of the power of the transmitting radio waves is generally regulated by, for example, domestic laws and/or regulations.

The wireless transceiver 103 is adapted to transmit and receive wireless signals. In the illustrative embodiment, the wireless transceiver 103 performs conversion from electric signals to radio signals and vice versa, modulation and demodulation, frequency conversion, and other processing in order to transmit and receive wireless signals.

The packet receiver 104 is adapted for extracting packets from signals received by the wireless signal transceiver 103.

The packet discriminator 105 has the function of analyzing received packets to discriminate data packets and control packets from each other. The packet discriminator 105 also has the function of generally controlling the wireless communication node 100, and specifically has the function of giving directions to appropriate parts or elements of the wireless communication node based on the result of the analysis and discrimination.

For example, when receiving control packets, the packet discriminator 105 analyzes data contained therein to update the neighbor node lookup table 106 and the route table 108 if needed. The packet discriminator 105 also transfers control packets, when required to be relayed, to the packet transmitter 112. When it is necessary to assemble responsive control packets, i.e. reply control packets, for transmission, the packet assembler 110 directs the packet assembler 110 to assemble appropriate reply control packets through a control line, not shown. The reply control packets can be classified into first reply control packets responsive to control packets arriving via unicasting, and second reply control packets responsive to control packets arriving via broadcasting or multicasting.

For example, the packet discriminator 105 is also adapted to be responsive to a specific control packet being received to determine whether or not first reply control packets responsive to the specific control packet should be sent back, i.e. sent in reply, based on the received signal strength intensity (RSSI) on reception. The packet discriminator 105 is further adapted to instruct, when reply control packets of second reply control packets are needed to be generated, the random time calculator 109 to calculate a random transmission delay time for the second reply control packets, as will be described later. Furthermore, the packet discriminator 105 serves as receiving data packets in such a fashion that, if the received data packets are destined for an own local node, which means a node having received those data packets, namely, a node in which the packet discriminator 105 is installed, then the packet discriminator 105 extracts data from the data packets to supply the data to the wired transceiver 113 on a signal line, not shown, and, if the received data packets are to be transferred to other nodes, then the packet discriminator 105 supplies them to the packet transmitter 112.

The neighbor node lookup table 106 is a storage area formed on a memory device, not shown, to store data in association with the respective neighbor nodes. For each of the neighbor nodes, data to be stored in the table 106 may include, for example, the state of a connection between the own local node 100 and that neighbor node; a received signal strength intensity (RSSI) at the time when a packet is received from the neighbor node; a packet reception rate from the neighbor node; and the rank value of the neighbor node. The neighbor node lookup table 106 holds those data items on the neighbor node under the control of the packet discriminator 105 which edits and manages the neighbor node lookup table 106.

The RSSI measurer 107 is adapted to measure a received signal strength intensity (RSSI) at the time of a reception of a packet. In FIG. 1, the RSSI measurer 107 is depicted as associated with the packet receiver 104, but may be mounted in association with the wireless transceiver 103.

The route table 108 is a storage area also formed in the memory device to store information such as rank values carried by control packets received from a neighbor node and parent information calculated from results of measurements of link quality with the neighbor node. The route table 108 stores the information under the control of the packet discriminator 105 which also edits and manages the route table 108.

The random time calculator 109 is adapted to calculate a transmission delay period of time until which a transmission of second reply control packets has to be delayed or refrained from. The length of a delay period of time may be calculated at random within a range that may be different in dependent upon, e.g. the rank value of an own local node. For example, the random time calculator 109 may calculate a transmission delay time period such that as an own local node has its rank value larger, i.e. it takes more hops up to the top node, it has its transmission delay time period longer.

One specific example of the calculation method will be given in the description of its operation.

The packet assembler 110 is adapted for assembling data packets and control packets to be generated by the own local node 100. For instance, the packet assembler 110 assembles data packets to incorporate therein data given from the outside via the wired transceiver 113 and a signal line, not shown. When transmitting a second reply control packet, the packet assembler 110 gives the generated second reply control packets to the delay unit 111 whereas when transmitting other types of packets, the packet assembler 110 provides the generated packets to the packet transmitter 112 on a signal line, not shown. The packet assembler 110 may take the initiative to selectively generate control packets or reply control packets.

The delay unit 111 functions as delaying the transmission timing of second reply control packets by a transmission delay time period determined by the random time calculator 109.

The packet transmitter 112 is adapted to execute processing necessary for transmitting packets. In the illustrative embodiment, the packet transmitter 112 refers to the route table 108, if necessary, and processes various packets generated by, or just transited through, the own local node appropriately for transmitting them toward appropriate destinations, even when broadcasting or multicasting. The processed packets are supplied to the wireless transceiver 103 for radiating to a wireless space.

The wired transceiver 113 is adapted to transmit and receive data, in the illustrative embodiment, over cables to and from an apparatus, e.g. a sensor per se when the wireless network is a sensor network, installed in connection with the wireless communication node 100.

Note that the wired transceiver 113 as well as the wireless transceiver 103 may be implemented in the form of physical components for transmitting and receiving packets, and those components may be connected, via an interface 115, to a signal processing system including the packet receiver 104, packet discriminator 105, neighbor node lookup table 106, RSSI measurer 107, route table 108, random time calculator 109, packet assembler 110, delay unit 111 and packet transmitter 112.

Next, reference will be made to FIG. 2 for use in describing the operation in a multi-hop wireless network according to the illustrative embodiment, the network being formed by the above-described wireless communication nodes 100 in plural.

For the sake of simplicity of illustration, one example will be described in which the multi-hop wireless network is structured by tree topology shown in FIG. 2.

Figure 2:
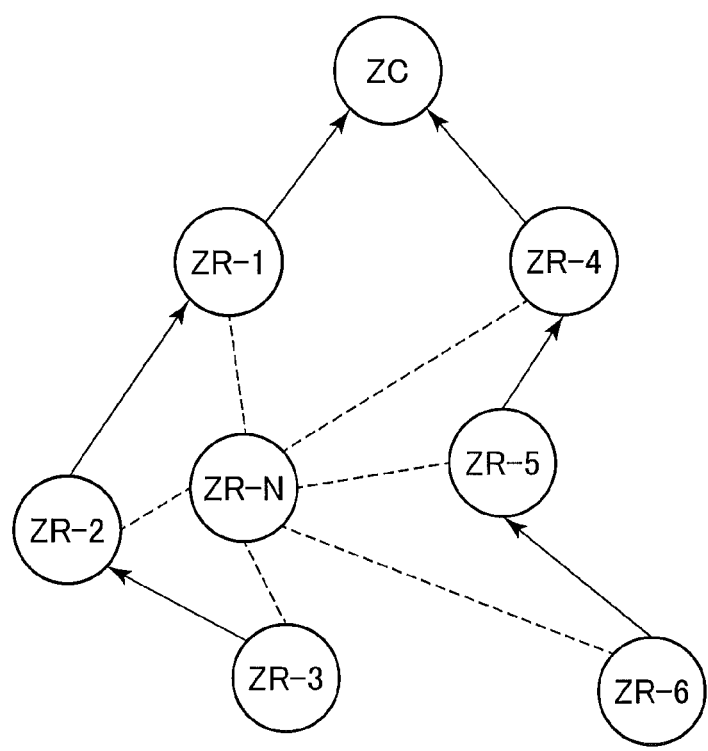
FIG. 2 shows an example of tree topology useful for understanding the operation of a multi-hop wireless network in accordance with the illustrative embodiment shown in FIG. 1.

In FIG. 2, a node ZC is a coordinator and lies at the vertex of the tree topology of the multi-hop wireless network. Under the coordinator ZC, routers ZR-1 to ZR-6 each of which is the wireless communication node 100 according to the illustrative embodiment are connected in a multi-hop fashion. In this state, a router ZR-N attempts to join in this wireless network as a new node. In FIG. 2, the newly joining router ZR-N is installed in a location where wireless signals from this newly joining router ZR-N reach all the other routers ZR-1 to ZR-6. In the following description, when designating the components of specific one of the routers, suffices "-1" through "-6" and "-N" follow the reference numerals designating those components depicted in FIG. 1.

In the illustrative embodiment, the newly joining router ZR-N has the neighbor node lookup table 106-N which is capable of registering data for six neighbor nodes at the maximum. Thus, an exemplary operation will be described where three neighbor nodes may be registered when the new router ZR-N joins, that is, half as many as the upper limit of registerable neighbor routers in the embodiment. That limitation may be set in order that the newly joining router ZR-N has a storage space remaining in the neighbor node lookup table 106-N for allowing additional, newly joining node to be registered. That is to say, if the newly joining router ZR-N would permit the neighbor node lookup table 106-N to register up to its maximum when joining in the network, the router ZR-N could no longer register a node that will join later on at all in the neighbor node lookup table 106-N.

Well, for comparing the operation of sending and receiving MLE messages according to the embodiment with the conventional operation, reference will be made to FIG. 3 which shows the conventional manner for sending and receiving MLE messages in the tree topology shown in FIG. 2.

Figure 3:
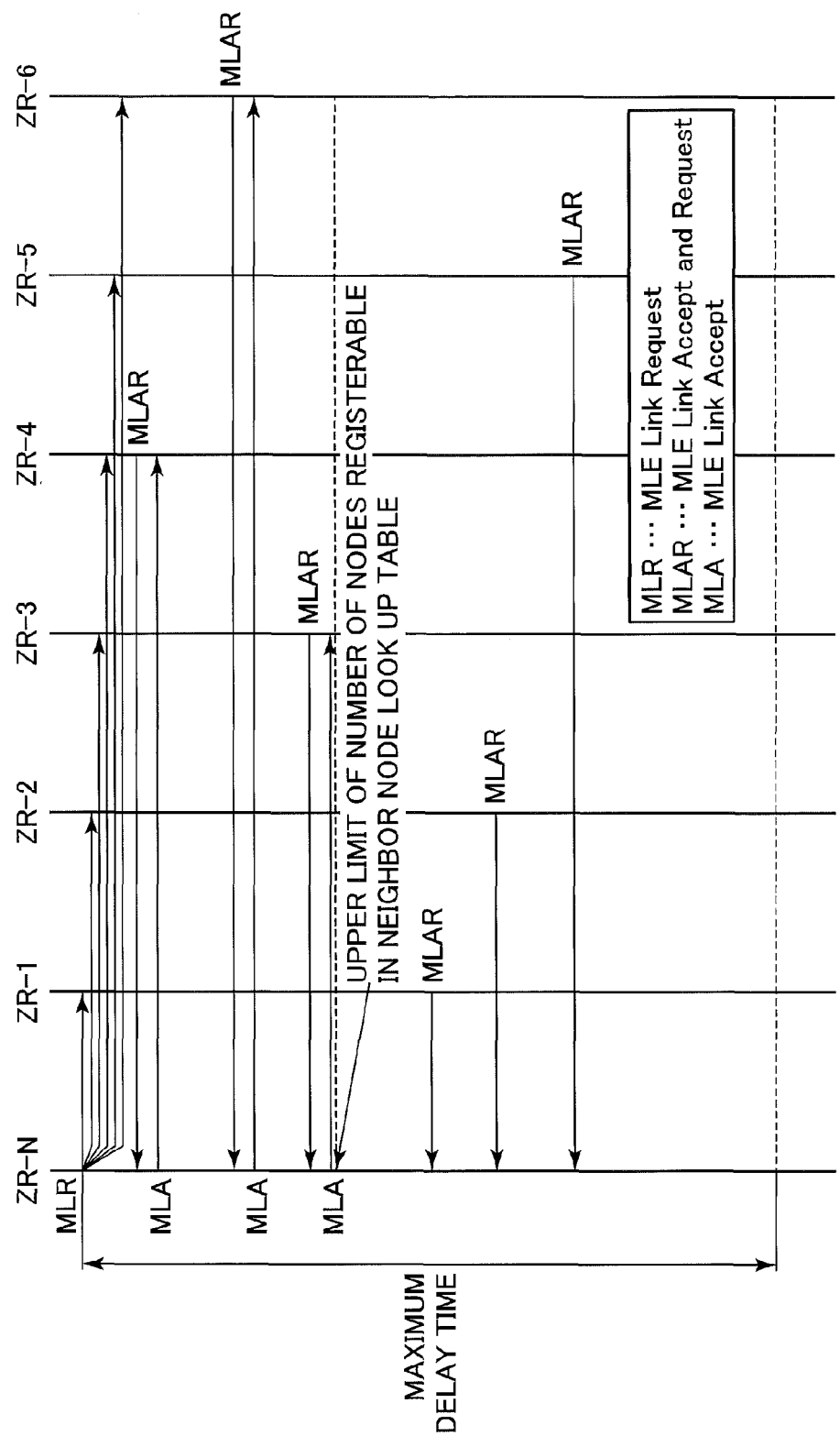
FIG. 3 is a sequence diagram useful for understanding a conventional transmitting and receiving manner of MLE messages in the tree topology shown in FIG. 2.

FIG. 3 shows MLE link accept MLA, MLE link accept and request MLAR, and MLE link request MLR, which are MLE messages and referred to as "control packets" as in the description of the configuration shown in FIG. 1. The MLE link accept MLA, and MLE link accept and request MLAR are especially referred to as "first reply control packets" and "second reply control packets", respectively. Since FIG. 3 shows the conventional manner, the random transmission delay time period in response to an MLE link accept and request MLAR is determined without taking account of the rank value of the own local node and the received signal strength intensity (RSSI) at the time when control packets (MLE link request MLR) are received.

In FIG. 3, when the newly joining router ZR-N multicasts an MLE link request MLR toward its peripheral nodes, the routers ZR-4, ZR-6 and ZR-3 send back as replies packets of an MLE link accept and request MLAR which denotes acknowledgement, and the routers ZR-1, ZR-2 and ZR-5 send back as replies packets of an MLE link accept and request MLAR. In the illustrative embodiment, if the routers ZR-1 to ZR-6 have their node lookup table 106 already filled up with data at the maximum number of registration, an MLE link accept and request MLAR is not sent back.

In FIG. 3, each of the routers ZR-1 to ZR-6 sends back an MLE link accept and request MLAR at a simply determined random timing. The newly joining router ZR-N sends back packets of an MLE link accept MLA in the order of received packets of MLE link accept and request MLAR. In the illustrative embodiment, the newly joining router ZR-N receives packets of MLE link accept and request MLAR from the neighbor nodes in the order of routers ZR-4, ZR-6, ZR-3, ZR-1, ZR-2 and ZR-5, and thus sends back packets of the MLE link accept MLA to the routers ZR-4, ZR-6 and ZR-3, and registers them in the neighbor node lookup table 106-N. At this time, as shown in FIG. 2, the routers ZR-3 and ZR-6 are connected to the coordinator ZC via three hops therefrom. Therefore, if the router ZR-3 or ZR-6 is selected as a parent node, the newly joining router ZR-N would be placed at the node spaced one more hop away so that the new router would be connected via four hops from the coordinator ZC. On the other hand, the router ZR-4 is connected via a single hop from the coordinator ZC but is physically distant from the newly joining router ZR-N, and hence there is a possibility that the wireless link quality would be lower so that stable communications may not be assured.

As described above, the conventional manner involves the problems. In order to solve those problems, the routers, i.e. wireless communication nodes, ZR-1 to ZR-6 according to the illustrative embodiment of the invention have the random time calculators 109-1 to 109-6 calculating transmission delay time period in a manner different from the conventional way.

Specifically, in the multi-hop wireless network according to the illustrative embodiment, the routers ZR-1 to ZR-6 do not send back an MLE link accept and request MLAR at random timing. The routers ZR-1 to ZR-6 determine the timing of sending an MLE link accept and request MLAR based on the rank value of that local router, i.e. own local node, and also based on the received signal strength intensity (RSSI) which is taken into consideration as a secondary factor in determining the timing.

In particular, the routers ZR-1 to ZR-6 include their respective random time calculators 109-1 to 109-6 calculating the number of hops made in going from the respective local routers to the coordinator ZC using the rank value, and then calculating a transmission delay time period within a range dependent upon the number of hops intervening. By the calculated transmission delay time period, the respective delay units 111-1 to 111-6 delay the transmission of an MLE link accept and request MLAR. The transmission delay time period may be determined within a range which is dependent on the number of intervening hops such that an MLE link accept and request MLAR can be sent back at earlier timing as the intervening hops are fewer. Thus, the possibility can be minimized that a router, or wireless communication node, having a large number of hops intervening is registered as a neighbor node in the neighbor node lookup table 106-N.

Next, reference will be made to FIG. 4 for describing a manner of sending and receiving MLE messages in a multi-hop wireless network according to the illustrative embodiment.

Figure 4:
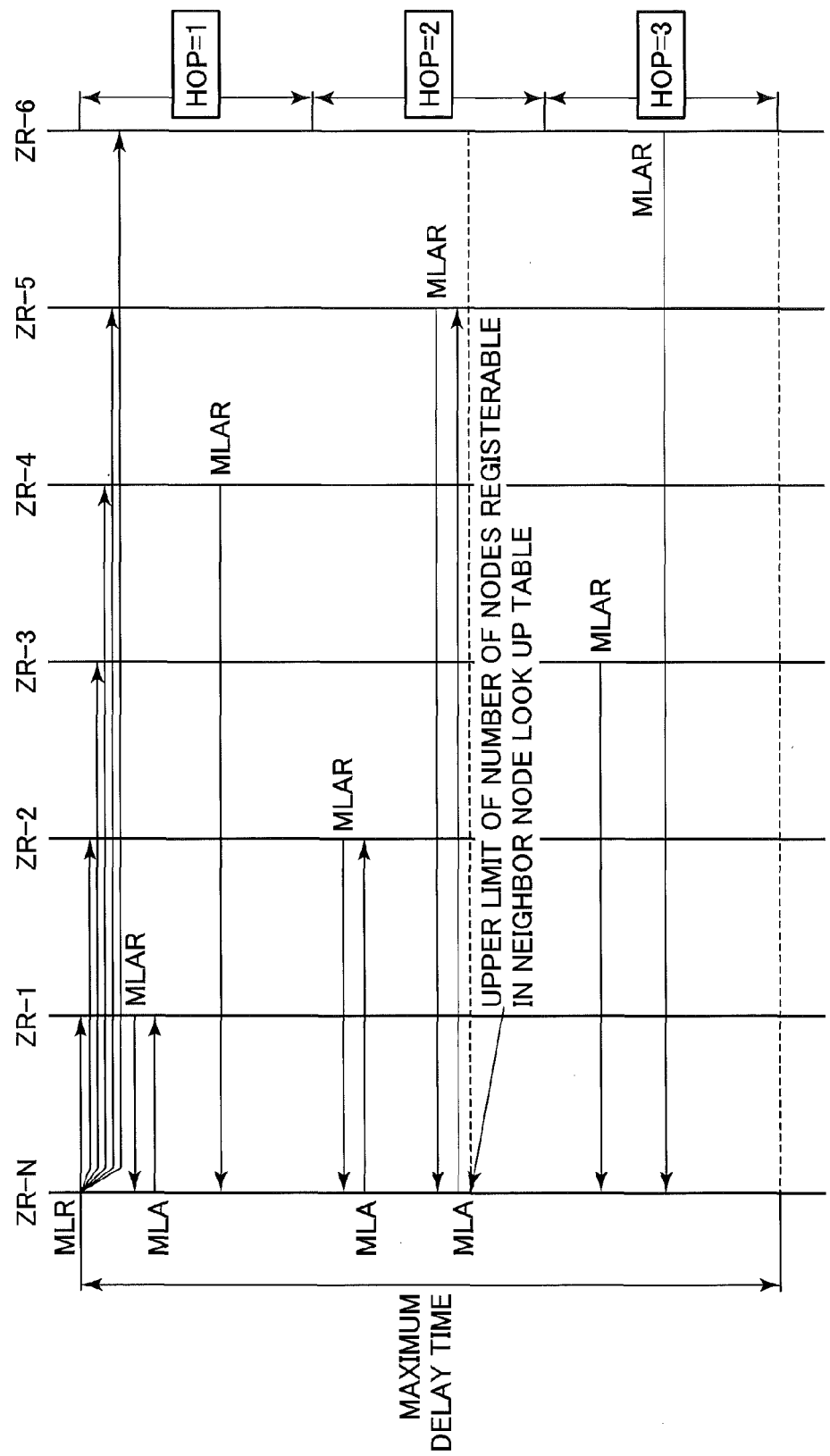
FIG. 4 is a sequence diagram useful for understanding a manner of transmitting and receiving MLE messages in accordance with the illustrative embodiment in the tree topology shown in FIG. 2.

In FIG. 4, according to the illustrative embodiment, when the newly joining router ZR-N multicasts an MLE link request MLR to its peripheral nodes, the MLE link request MLR is received by the respective routers ZR-1 to ZR-6. The respective routers ZR-1 to ZR-6 include the random time calculators 109-1 to 109-6 calculating, with the use of the rank value, a transmission delay time period within ranges depending on the numbers of hops intervening from the respective routers to the coordinator ZC. In the tree topology of FIG. 2, with respect to the coordinator ZC, the routers ZR-1 and ZR-4 are positioned via one hop, the routers ZR-2 and ZR-5 via two hops, and the routers ZR-3 and ZR-6 via three hops.

The routers ZR-1 and ZR-4 are positioned with respect to the coordinator ZC via a single hop, and thus may calculate a transmission delay time period within a range closest to its minimum value. Therefore, the routers ZR-1 and ZR-4 send back an MLE link accept and request MLAR to the newly joining router ZR-N at earlier timing than the other routers ZR-2, ZR-3, ZR-5 and ZR-6. The routers ZR-2 and ZR-5 located via two hops may calculate a transmission delay time period within a range, which may be called intermediate, between its maximum and minimum. Therefore, those routers ZR-2 and ZR-5 send back an MLE link accept and request MLAR to the newly joining router ZR-N at earlier timing than the other routers ZR-3 and ZR-6. Finally, the routers ZR-3 and ZR-6 located via three hops may calculate a transmission delay time period within a range closest to its maximum value, and thus send back an MLE link accept and request MLAR to the newly joining router ZR-N at the latest timing.

One example of defining ranges within which a random delay period of time is calculated by means of the number of hops may be to add an offset value predetermined in dependent on the number of hops of a local router or node of interest to a random number generated when determining sending back timing, i.e. a transmission delay time period. Specifically, in an application where the maximum delay time period is 9 seconds, the routers ZR-1 and ZR-4 whose number of hops is "1" generate as a transmission delay time period a random number falling between 0 and 3 second. The routers ZR-2 and ZR-5 whose number of hops is "2" produce a transmission delay time period by adding an offset value of "3" to a random number generated between 0 and 3 second. The routers ZR-3 and ZR-6 whose number of hops is "3" produce a transmission delay time period by adding an offset value of "6" to a random number generated between 0 and 3 second.

The illustrative embodiment is thus configured to compute the number of hops from the rank number of a router of interest. Alternatively, the rank number may be multiplied by a random number so as to directly determine the timing for sending an MLE link accept and request MLAR in reply. Further alternatively, the rank value of a router of interest may be normalized with the maximum delay time period so that the timing for sending an MLE link accept and request MLAR in reply may be advanced when the router has its rank value smaller.

However, if routers or nodes with fewer hops were simply registered with higher priority in the neighbor node lookup table 106-N, there would be a possibility that nodes with lower link quality may be selected. In order to avoid such a case, according to the present embodiment, the newly joining router ZR-N may refer to the received signal strength intensity (RSSI) at the time when an MLE link accept and request MLAR is received so as not to send back an MLE link accept MLA to peripheral routers from which the received signal strength intensity (RSSI) lower than a predetermined level has been received. For example, in the illustrative embodiment, the newly joining router ZR-N does not send back an MLE link accept MLA to peripheral routers having sent the MLE link accept and request MLAR with the received signal strength intensities lower than 95 dBm. Thus, as shown in FIG. 4, for example, the newly joining router ZR-N does not send back an MLE link accept MLA to the router ZR-4, although the router ZR-4 has sent the MLE link accept and request MLAR to the newly joining router ZR-N, because of an insufficient received signal strength intensity.

It is to be noted that it is possible to determine whether or not the received signal strength intensity is strong enough even in the node which has received the MLE link request MLR. Therefore, in FIG. 4, the router ZR-4 having received the MLE link request MLR may refer to the received signal strength intensity (RSSI), and determine not to send back an MLE link accept and request MLAR to the newly joining router ZR-N on account of an insufficient received signal strength intensity.

Of course, other indices than the received signal strength intensity on a link may be used as an index indicative of link communication quality. In other words, other indices are applicable so far as they are physical quantities or parameters associated with or dependent on the number of hops. For example, in the case of a multi-hop wireless network where a route would not fluctuate when radio waves reflect, sets of positional information may be exchanged between nodes so that a physical link distance may be used as an index indicative of link communication quality. Also, the S/N (Signal-to-Noise) ratio may be found from a fluctuation in signal level during the preamble period of control packets to use the ratio as an index indicative of link communication quality.

In FIG. 4, when the newly joining router ZR-N has the neighbor node lookup table 16-N filled up to its predetermined maximum number, tree in this embodiment, the newly joining router ZR-N does not send back an MLE link accept MLA to the other routers. For example, as seen from the figure, at the time when the MLE link accept and request MLAR from the router ZR-5 is received, the number of routers registered in the neighbor node lookup table 16-N of the newly joining router ZR-N has reached its upper limit, and thus the newly joining router ZR-N does not send back an MLE link accept MLA to the routers ZR-3 and ZR-6 even when the newly joining router ZR-N receives an MLE link accept and request MLAR from either of them.

According to the illustrative embodiment, in the case when a newly joining node exchanges control packets with peripheral nodes for formulating a neighbor node lookup table, it is possible to register, with the neighbor node lookup table of the newly joining node, appropriate peripheral nodes such as peripheral nodes having a smaller number of hops, peripheral nodes having a smaller value of rank and peripheral nodes which are linked with the newly joining node with stronger received signal strength intensities. It is therefore possible to establish a stabler multi-hop wireless network than the prior art.

In the above-described embodiment, the received signal strength intensity of a link is directly used for making a decision as to whether the node is registered as a neighbor node. However, physical parameters other than the intensity may indirectly be used for making such a decision. For example, an offset time may be set to correspond to the received signal strength intensity, and added to a transmission delay time period primarily calculated out, thus the received signal strength intensity indirectly influencing the decision as to whether to register a neighbor node. Even in that case, if the received signal strength intensity is below a given threshold value, it may be determined that the node is not to be registered.

Of course, other determinants than the received signal strength intensity on a link may be used for making a decision whether or not a node is registered as a neighbor node. For example, the number of hops or rank number of a neighbor node of interest may solely be used to make such a decision. In other words, the decision can be made depending only on the order of arrival of an MLE link accept and request MLAR. Note that, between remote nodes, communications cannot be established in the nature, and hence, even when the decision is made without using the received signal strength intensity, communications between the neighbor nodes can be established.

Well, reference will be made to FIG. 5 to describe an alternative embodiment of a wireless communication node in a multi-hop wireless network in accordance with the present invention. Throughout the application, like components and elements are designated with the same reference numerals, and repetitive descriptions thereon will be refrained from.

Figure 5:
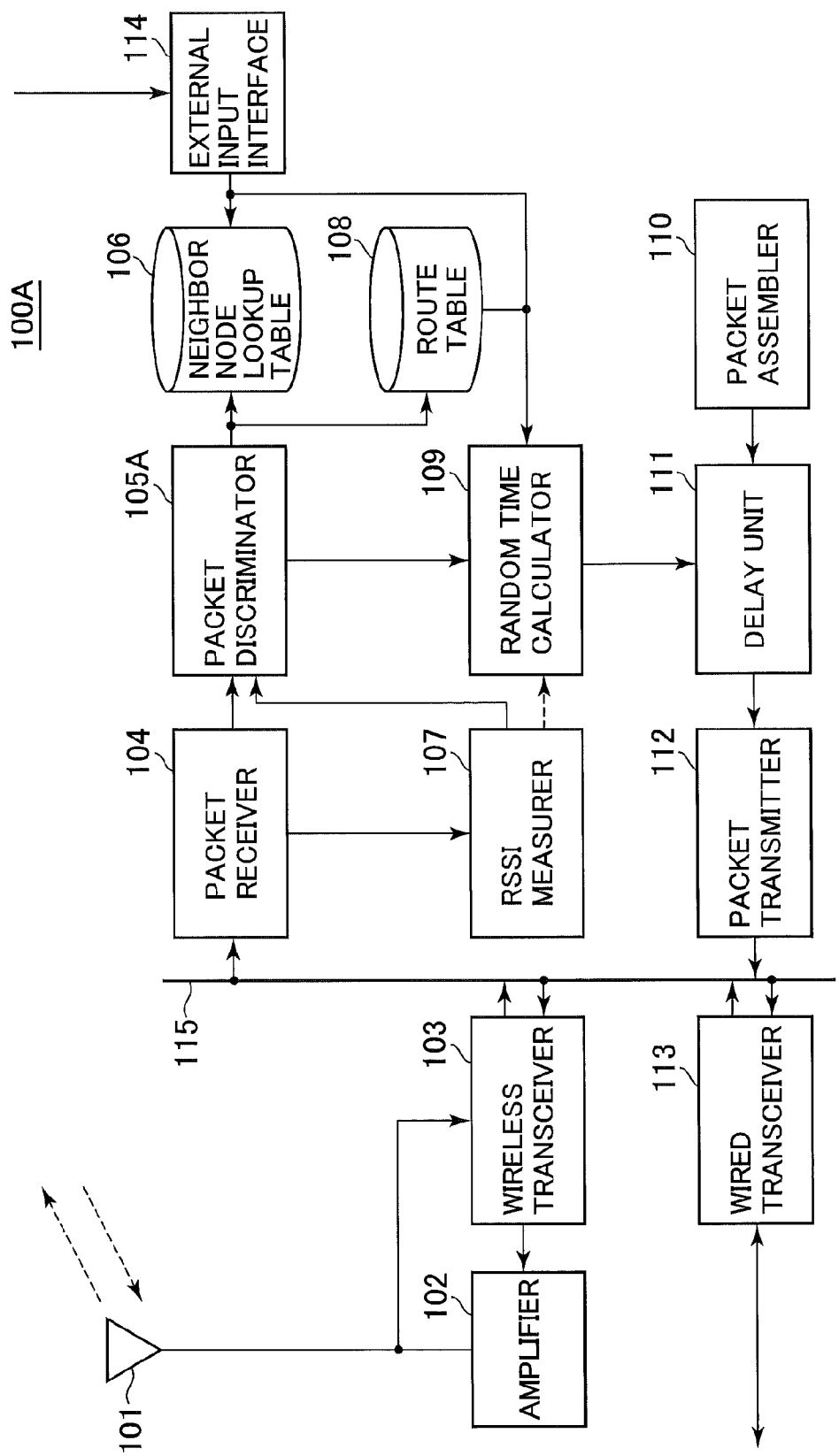
FIG. 5 is a schematic block diagram showing the configuration of a wireless communication node in accordance with an alternative illustrative embodiment of the present invention.

As shown in FIG. 5, the wireless communication node 100A according to the second embodiment includes a packet discriminator 105A and an external input interface 114 in addition to the antenna 101, amplifier 102, wireless transceiver 103, packet receiver 104, neighbor node lookup table (LUT) 106, RSSI measurer 107, route table 108, random time calculator 109, packet assembler 110, delay unit 111, packet transmitter 112 and wired transceiver 113, which may substantially be identical with those of the illustrative embodiment shown in and described with reference to FIG. 1. The packet discriminator 105A is somewhat different in function from the packet discriminator 105 of the embodiment shown in FIG. 1.

Specifically, the packet discriminator 105A of the alternative embodiment may substantially be identical with the packet discriminator 105 except for having an additional function of enabling, even when registering information on neighbor nodes through exchanging control packets, the information on the neighbor nodes registered in the neighbor node lookup table 106 via the external input interface 114. This additional function of the packet discriminator 105A will be described in connection with its operation.

The external input interface 114 is adapted to receive information from outside. In the alternative embodiment, the external input interface 114 receives an identification on a certain neighbor node from the outside, e.g. a maintenance terminal. In the context, the term "identification" means any kinds of information, such as ID number or code, which is specific to an object, such as node or network. The received identification is registered on the neighbor node lookup table 106 by the external input interface 114. In the alternative embodiment, the neighbor node lookup table 106 may include a field for storing information such as a flag for indicating whether or not registered information is obtained via the external input interface 114. Thus, in each record or entry of node information registered on the neighbor node lookup table 106, information, not shown, is added about whether or not the node information has come from the external input interface 114.

In the previous embodiment shown in FIG. 1, nodes having a smaller number of hops or a smaller value of rank can be preferentially registered in the neighbor node lookup table 106. However, MLE messages of the mesh link establishment protocol MLE are transmitted and received wirelessly, and it is therefore not assured, due to a possible collision of packets, that the messages reach a destination node. Furthermore, the number of nodes capable of being registered in the neighbor node lookup table 106 is restricted so as not to exceed its upper limit, and hence it is not assured in the previous embodiment that a peripheral node that the user desires to register is always registered in the neighbor node lookup table 106.

In order to allow registration of a peripheral node that the user wishes to register, the wireless communication node 100A according to the alternative embodiment includes the external input interface 114 which allows an identification of a neighbor node that the user wishes to register in the neighbor node lookup table 106 to be registered in advance in the table 106.

Figure 6A:
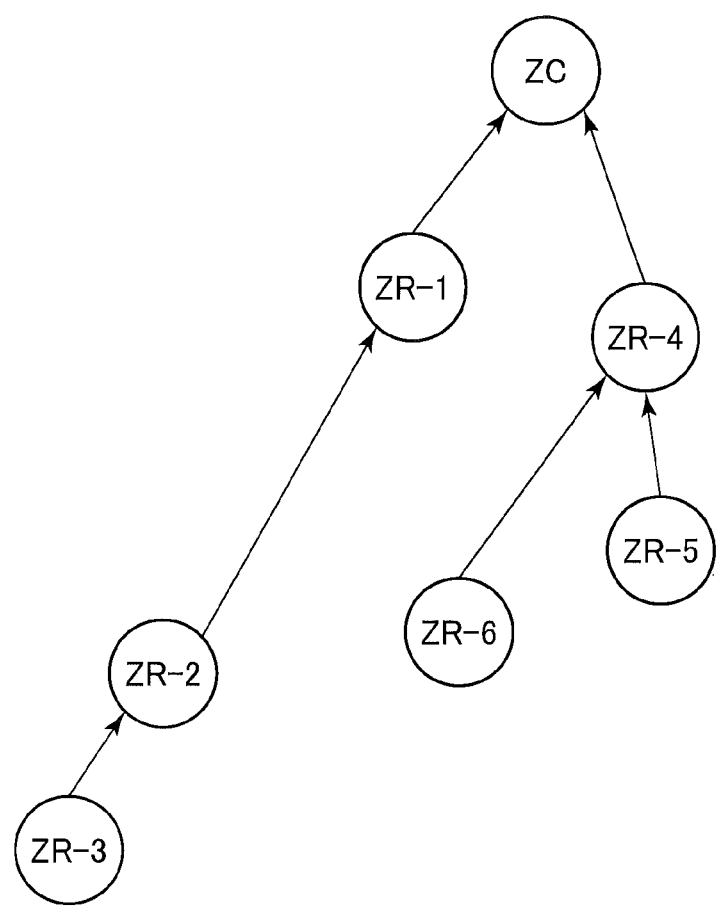
FIGS. 6A and 6B illustrate examples of tree topology useful for understanding the necessity of in-advance registered neighbor nodes in a multi-hop wireless network in accordance with the alternative illustrative embodiment shown in FIG. 5.
Figure 6B:
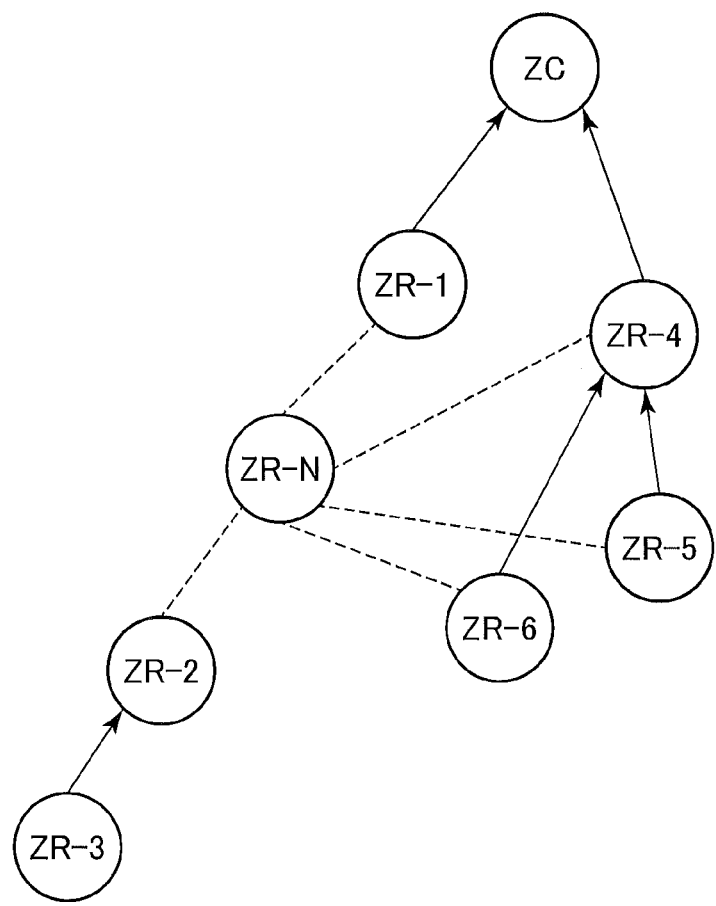

Next, reference will be made to FIGS. 6A and 6B for use in describing an operation in a multi-hop wireless network according to the alternative embodiment. FIG. 6A shows a state where the newly joining router ZR-N has not yet joined in the wireless network. Under this condition, the link quality is lower between the routers ZR-1 and ZR-2. In this example, the user in turn intends to establish a relay of data between the routers ZR-1 and ZR-2, and thus installs the new router ZR-N between them, as shown in FIG. 6B, in order to allow the router ZR-N to relay or transfer packets. In this case, if the newly joining router ZR-N would register the routers ZR-1, ZR-4 and ZR-5 as its neighbor nodes, then the new router ZR-N could not serve as a relay station between the routers ZR-1 and ZR-2 since three neighbor nodes can be registered at the maximum.

Accordingly, in the alternative embodiment, in order to allow the routers ZR-1 and ZR-2 to be registered as neighbor nodes in the neighbor node lookup table 106-N, the newly joining router ZR-N, when powered on, can register beforehand the identifications of the routers ZR-1 and ZR-2 in its neighbor node lookup table 106-N. The in-advance registration causes the router ZR-N to operate as a relay station between the routers ZR-1 and ZR-2.

Of course, in place of identifications to be registered in advance, any information may be used so far as it is associated with a link where the newly joining router ZR-N is designed to transfer data. Also, the system may be designed to register one, three or more neighbor nodes in advance in the neighbor node lookup table 106-N, not being limitative to registering two neighbor nodes.

Since the identification is registered in advance on the neighbor node lookup table 106-N, the packet discriminator 105A-N in the newly joining router operates to receive packets of an MLE link accept and request MLAR from all the neighbor nodes or routers ZR-1 and ZR-2 registered in advance, and to assuredly send back packets of an MLE link accept MLA to the in-advance registered neighbor nodes ZR-1 and ZR-2. The packet discriminator 105A-N also manages how many neighbor nodes remain registerable on the table 106-N. Thus, if, among the in-advance registered neighbor nodes, a node or nodes from which packets of an MLE link accept and request MLAR have not arrived remain and are fewer than the number of nodes additionally registerable, then the packet discriminator 105A-N enables an MLE link accept request MLAR sent from neighbor nodes not registered in advance to be acceptable to cause the packet transmitter 112 to transmit an MLE link accept MLA as a reply. When the number of in-advance registered neighbor nodes from which packets of an MLE link accept and request MLAR have not yet arrived reaches the number of nodes additionally registerable, the packet discriminator 105A-N disables an MLE link accept and request MLAR sent from the neighbor nodes not registered in advance to inhibit an MLE link accept MLA from being sent back.

Figure 7:
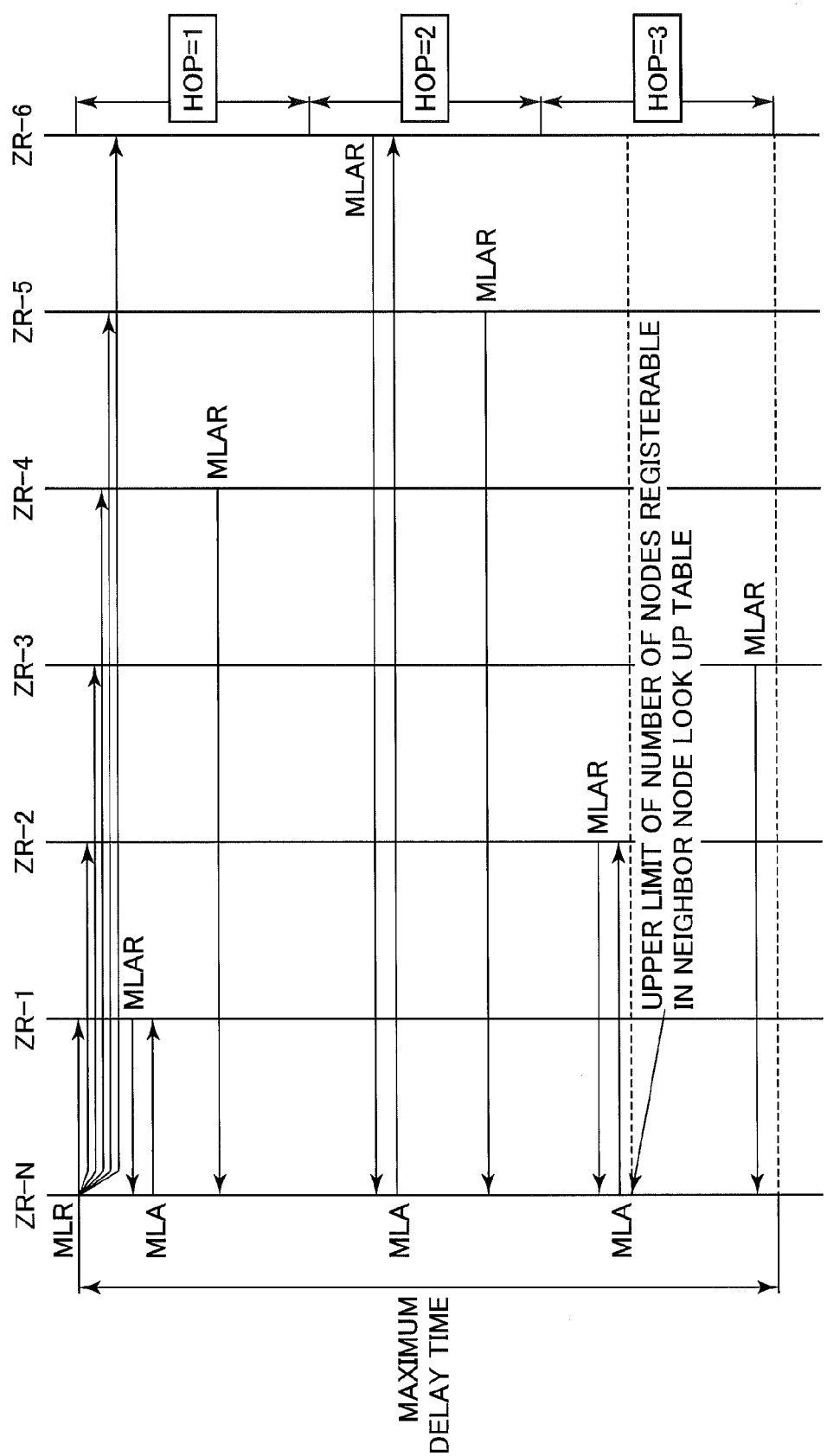
FIG. 7 is a sequence diagram useful for understanding a manner of transmitting and receiving MLE messages in the tree topology shown in FIG. 6B in accordance with an alternative illustrative embodiment.
Figure 8A:
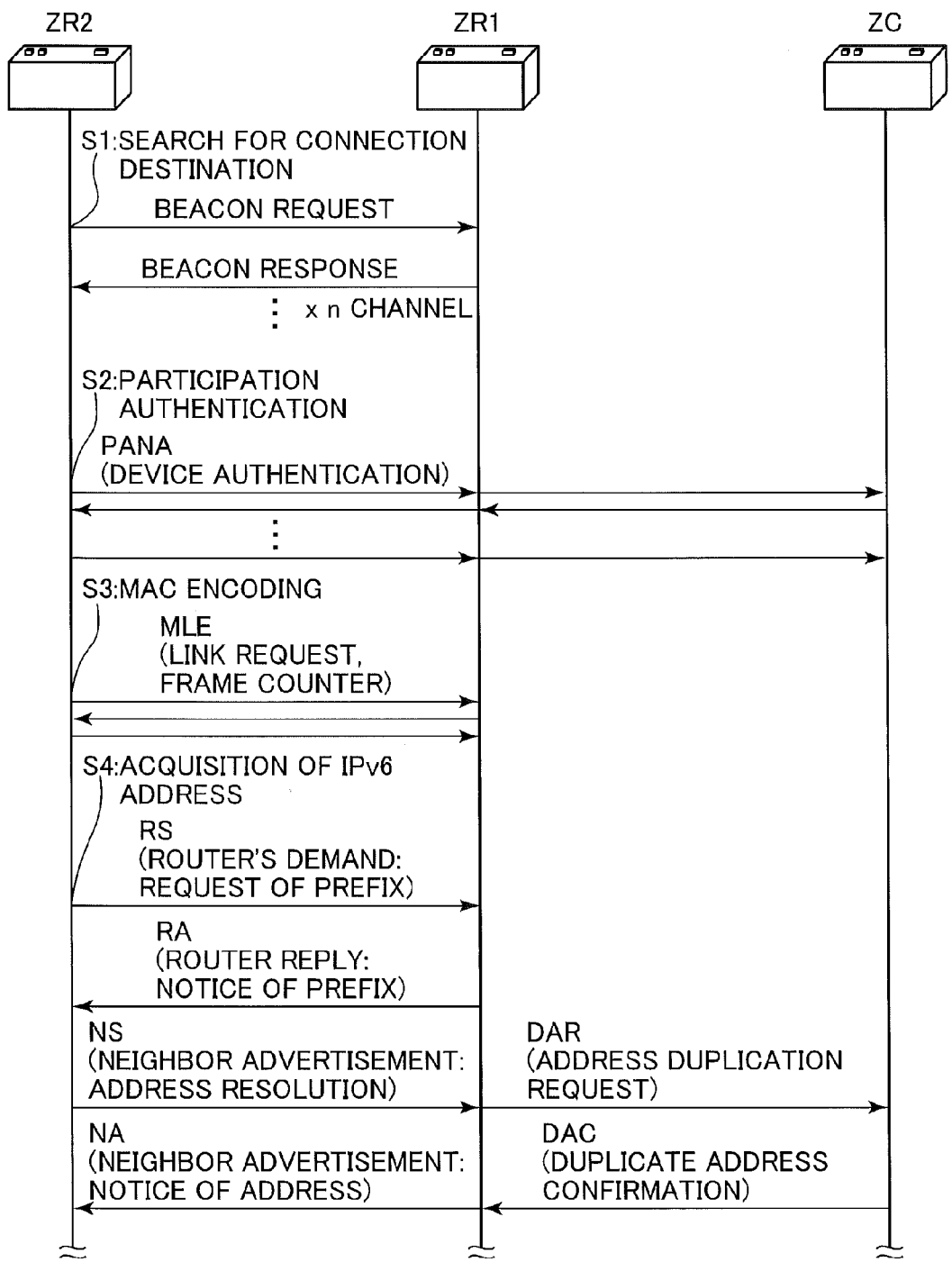
FIGS. 8A and 8B are sequence diagrams for understanding the operation of routers or wireless communication nodes and a coordinator in ZIP (ZigBee IP).
Figure 8B:
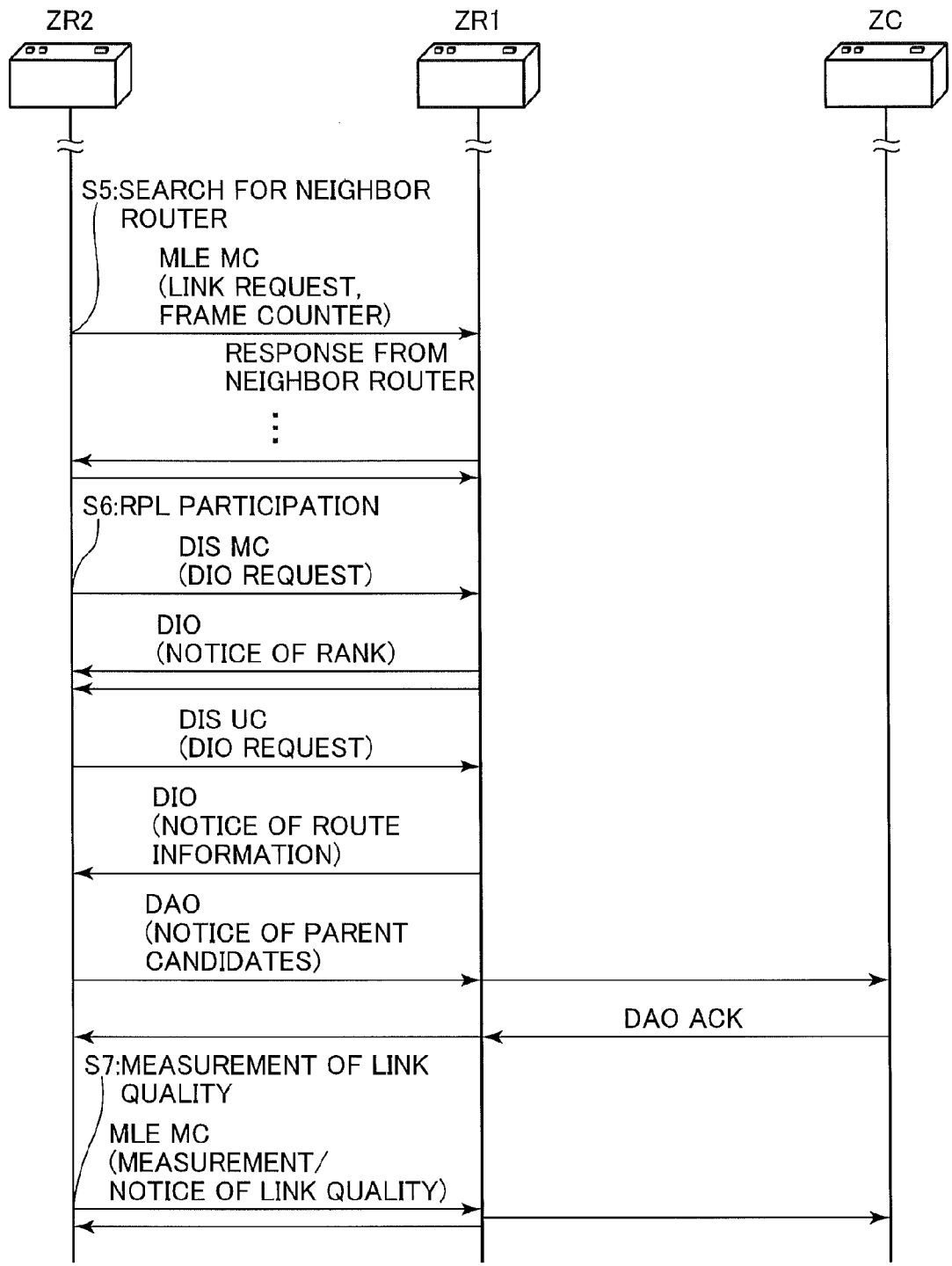

Next, reference will be made to FIG. 7 for describing a manner of sending and receiving MLE messages in a multi-hop wireless network according to the alternative embodiment. The illustrated manner of sending and receiving MLE messages shown in the figure is performed in a situation where the newly joining router ZR-N is installed as a repeater station between the routers ZR-1 and ZR-2 as shown in FIG. 6B. FIG. 7 shows processing after the routers ZR-1 and ZR-2 are registered in advance as neighbor nodes in the neighbor node lookup table 106-N of the newly joining router ZR-N via the external input interface 114-N.

First, when an MLE link accept and request MLAR is arrived from the router ZR-1, the packet discriminator 105A-N of the newly joining router ZR-N sends in reply a packet of an MLE link accept MLA because information about the router ZR-1 has been registered in advance in the neighbor node lookup table 106-N. At this time, the number of nodes remaining capable of being registered in the neighbor node lookup table 106-N becomes decremented to two.

When an MLE link accept and request MLAR is sent from the router ZR-4, the newly joining router ZR-N does not register the router ZR-4 as a neighbor node in the neighbor node lookup table 106-N because of a low received signal strength intensity, and does not send back an MLE link accept MLA in the same way as in the embodiment shown in FIG. 4.

Then, when an MLE link accept and request MLAR from the router ZR-6 arrives, the neighbor node lookup table 106-N can register other neighbor nodes than the in-advance registered nodes, and hence the router ZR-6 is registered as a neighbor node in the neighbor node lookup table 106-N. Then, the newly joining router ZR-N sends back an MLE link accept MLA to the outer ZR-6. Thus, the number of nodes remaining capable of being registered in the neighbor node lookup table 106-N is decremented to one.

At this point of time, the newly joining router ZR-N has not received an MLE link accept and request MLAR from the router ZR-2 registered in advance. Therefore, when an MLE link accept and request MLAR arrives from the router ZR-5 not registered subsequently, the newly joining router ZR-N, even if the received signal strength intensity is good, neither registers the router ZR-5 as a neighbor node in the neighbor node lookup table 106-N nor sends back an MLE link accept MLA. That is, the newly joining router ZR-N continues to wait for an arrival of an MLE link accept and request MLAR from the router ZR-2 registered in advance.

When an MLE link accept and request MLAR subsequently arrives from the in-advance registered router ZR-2, the newly joining router ZR-N sends back an MLE link accept MLA because information about the router ZR-2 has been registered beforehand in the neighbor node lookup table 106-N. Thus, no nodes remain registerable in the neighbor node lookup table 106-N.

Therefore, when an MLE link accept and request MLAR arrives subsequently, any node is not registered in the neighbor node lookup table 106-N. Also, an MLE link accept MLA is not sent back.

In the alternative embodiment, only a newly installed node has information about neighbor nodes registered in advance. However, the other routers may have information about neighbor nodes registered in advance. For example, in an application where the routers ZR-1 and ZR-2 also have information about the newly joining router ZR-N registered in their neighbor node lookup tables 106-1 and 106-2, it is surely possible to register information on all of the routers ZR-1, ZR-2 and ZR-N involved in a new relaying route whereby the user can establish a desired relaying route with greater certainty.

Of course, any other ways can be used for performing the above-described registration. For example, the following method can be used instead of the processing shown in FIG. 7.

Specifically, before multicasting the MLE link request MLR, the newly joining router ZR-N allows the packet assembler 110-N and packet transmitter 112-N to unicast packets of the MLE link request MLR to the in-advance registered routers ZR-1 and ZR-2. That makes it possible to prevent a conflict in timing from occurring between the transmission of the MLE link accept request MLAR from routers other than the routers ZR-1 and ZR-2 and the transmission of the MLE link accept and request MLAR from the routers ZR-1 and ZR-2. Therefore, control messages of the mesh link establishment protocol MLE can successfully be exchanged with much more improved rate.

The unicast transmission of an MLE link request MLR between nodes registered beforehand may be performed before the ordinary multicasting of the MLE link request MLR. However, it may be conducted after the ordinary exchange of control messages of the mesh link establishment protocol MLE. In the latter case, the upper limit of the number of nodes that can be registered in the neighbor node lookup table may be adjusted by reducing the number of in-advance registered neighbor routers from the upper limit of the number of nodes registerable in the neighbor node lookup table.

The alternative embodiment may provide the same advantageous effects as the illustrative embodiment shown in and described with reference to FIG. 1. In addition, according to the alternative embodiment, it is possible to ensure information on neighbor nodes intended to relay packets to be registered in the neighbor node lookup table of a newly joining node, whereby the user can build his or her desired network configuration.

In the illustrative embodiments described above, the mesh link establishment protocol MLE is used as a protocol for registering neighbor nodes. However, the present invention can be applied also to other multi-hop wireless networks operative with similar types of protocol.

The entire disclosure of Japanese patent application No. 2013-197271 filed on Sep. 24, 2013, including the specification, claims, accompanying drawings and abstract of the disclosure, is incorporated herein by reference in its entirety.

What we claim is:

1. A wireless communication node on a multi-hop wireless network, said wireless communication node comprising:
    a neighbor node information storage storing information about a neighbor node;
    a control message exchanger exchanging a control message with a peripheral node to determine a neighbor node whose information should be registered in said neighbor node information storage;
    a timing adjuster referencing a connective state of said wireless communication node in the multi-hop wireless network to adjust timing at which a first control message is to be sent back in response to a second control message arriving from another wireless communication node; and
    a registered node determiner using an order of arrival of the first control message from the other wireless communication node to determine the neighbor node whose information should be registered in said neighbor node information storage,
    wherein the multi-hop wireless network is formed in a tree topology, and the connective state of said wireless communication node on the multi-hop wireless network which is referenced by said timing adjuster is a number of hops intervening from a node located at a vertex of the tree topology to said local wireless communication node or an index from which the number of hops can be derived, said timing adjuster adjusting the timing at which the first control message is to be sent back so that delay of the timing becomes reduced as the number of hops decreases.

2. The wireless communication node in accordance with claim 1, wherein, when an index indicative of link communication quality obtained when the first control message has arrived from the other wireless communication node is lower than a predetermined threshold value, said registered node determiner does not determine the other wireless communication node as the neighbor node to be registered.

3. The wireless communication node in accordance with claim 2, wherein the index indicative of the link communication quality is a received signal strength intensity obtained when a control message is received.

4. The wireless communication node in accordance with claim 1, wherein, when an index indicative of link communication quality obtained when the second control message has arrived from the other wireless communication node is lower than a predetermined threshold value, said control message exchanger does not send back the first control message.

5. The wireless communication node in accordance with claim 4, wherein the index indicative of the link communication quality is a received signal strength intensity obtained when a control message is received.

6. The wireless communication node in accordance with claim 1, further comprising an external input interface receiving an identification of the neighbor node to be registered in said neighbor node information storage to register the identification beforehand in said neighbor node information storage.

7. The wireless communication node in accordance with claim 6, wherein said control message exchanger receives the first control message from the neighbor node whose identification has been registered beforehand in said neighbor node information storage, and sends back a third control message responsive to the first control message to the neighbor node registered beforehand.

8. The wireless communication node in accordance with claim 6, wherein said control message exchanger exchanges the first and second control messages with the neighbor node registered beforehand via unicasting before the first control message is sent via multicasting.

9. The wireless communication node in accordance with claim 6, wherein said control message exchanger exchanges the first and second control messages with the neighbor node registered beforehand via unicasting after exchanging a series of control messages responsive to multicast transmission of the second control message.

10. A multi-hop wireless network comprising a wireless communication node which comprises:
    a neighbor node information storage storing information about a neighbor node;
    a control message exchanger exchanging a control message with a peripheral node to determine a neighbor node whose information should be registered in said neighbor node information storage;
    a timing adjuster referencing a connective state of said wireless communication node in said multi-hop wireless network to adjust timing at which a first control message is to be sent back in response to a second control message arriving from another wireless communication node;
    a registered node determiner using an order of arrival of the first control message from the other wireless communication node to determine the neighbor node whose information should be registered in said neighbor node information storage,
    wherein the multi-hop wireless network is formed in a tree topology, and
    the connective state of said wireless communication node on the multi-hop wireless network which is referenced by said timing adjuster is a number of hops intervening from a node located at a vertex of the tree topology to said local wireless communication node or an index from which the number of hops can be derived, said timing adjuster adjusting the timing at which the first control message is to be sent back so that delay of the timing becomes reduced as the number of hops decreases.

11. A non-transitory computer-readable storage medium on which stored is a wireless communication node program for instructing a computer installed at a wireless communication node of a multi-hop wireless network to function as:
    a neighbor node information table storing information about a neighbor node;
    a control message exchanger exchanging a control message with a peripheral node to determine a neighbor node whose information should be registered in said neighbor node information table;

a timing adjuster referencing a connective state of the wireless communication node in the multi-hop wireless network to adjust timing at which a first control message is sent back in response to a second control message arriving from another wireless communication node; and a registered node determiner using an order of arrival of the first control message from the other wireless communication node to determine the neighbor node whose information should be registered in said neighbor node information table, wherein the multi-hop wireless network is formed in a tree topology, and the connective state of said wireless communication node on the multi-hop wireless network which is referenced by said timing adjuster is a number of hops intervening from a node located at a vertex of the tree topology to said local wireless communication node or an index from which the number of hops can be derived, said timing adjuster adjusting the timing at which the first control message is to be sent back so that delay of the timing becomes reduced as the number of hops decreases.

\* \* \* \* \*